US009207146B2

(12) United States Patent
Melzig et al.

(10) Patent No.: US 9,207,146 B2
(45) Date of Patent: Dec. 8, 2015

(54) METHOD AND APPARATUS FOR MONITORING AN ELECTROMAGNETIC HYDRAULIC VALVE FOR A VARIABLE VALVE TIMING SYSTEM

(71) Applicant: Dr. Ing. h.c. F. Porsche Aktiengesellschaft, Stuttgart (DE)

(72) Inventors: Thomas Melzig, Hoefingen (DE); Stephan Pelters, Tiefenbronn (DE); Arno Wunderlich, Sindelfingen (DE); Lutz Kretzschmar, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/458,260

(22) Filed: Aug. 13, 2014

(65) Prior Publication Data

US 2015/0057879 A1    Feb. 26, 2015

(30) Foreign Application Priority Data

Aug. 20, 2013  (DE) .................. 10 2013 108 966

(51) Int. Cl.
  *G06F 17/00* (2006.01)
  *G06F 19/00* (2011.01)
  *G01M 15/04* (2006.01)
  *H01F 7/18* (2006.01)
  *F01L 13/00* (2006.01)

(52) U.S. Cl.
  CPC .......... *G01M 15/042* (2013.01); *F01L 13/0036* (2013.01); *H01F 7/1844* (2013.01); *F01L 2800/11* (2013.01); *F01L 2820/031* (2013.01)

(58) Field of Classification Search
  CPC combination set(s) only.
  See application file for complete search history.

(56) References Cited

U.S. PATENT DOCUMENTS

| 5,282,443 | A |  | 2/1994 | Fujiyoshi et al. |
| 2001/0022163 | A1 | * | 9/2001 | Cosfeld et al. ............. 123/90.11 |
| 2005/0248902 | A1 | * | 11/2005 | Kotwicki ...................... 361/152 |
| 2008/0066701 | A1 |  | 3/2008 | Sun |
| 2012/0031360 | A1 |  | 2/2012 | Laufenberg et al. |

FOREIGN PATENT DOCUMENTS

| DE | 19606054 A1 | 8/1997 |
| DE | 19736064 A1 | 2/1999 |
| DE | 19908899 B4 | 6/2000 |
| DE | 102004030779 A1 | 1/2006 |
| DE | 202009006940 U1 | 9/2010 |
| DE | 102012005953 A1 | 9/2013 |
| JP | 04211777 A | 8/1992 |
| JP | 05156914 A | 6/1993 |
| JP | 10311455 A | 11/1998 |
| JP | 2012026299 A | 2/2012 |

* cited by examiner

*Primary Examiner* — Thomas Tarcza
*Assistant Examiner* — Edward Pipala
(74) *Attorney, Agent, or Firm* — Leydig, Voit & Mayer, Ltd.

(57) ABSTRACT

A method monitors an electromagnetic hydraulic valve for controlling a hydraulically adjustable valve gear of a reciprocating piston engine. The hydraulic valve includes an electromagnetic coil and a moving armature configured to connect a control port hydraulically to a high-pressure port or a low-pressure port, depending on an energization of the coil. The method includes detecting a movement of the armature, using a control unit, in response to an energization of the coil based on a mutual induction in the coil and identifying a defect, using the control unit, if the expected mutual induction does not occur.

13 Claims, 4 Drawing Sheets

METHOD AND APPARATUS FOR MONITORING AN ELECTROMAGNETIC HYDRAULIC VALVE FOR A VARIABLE VALVE TIMING SYSTEM

CROSS REFERENCE TO RELATED APPLICATIONS

Priority is claimed to German Patent Application No. DE 10 2013 108 966.6, filed on Aug. 20, 2013, the entire disclosure of which is hereby incorporated by reference herein.

FIELD

The invention relates to a hydraulic valve adjustment system for a reciprocating piston engine.

BACKGROUND

A reciprocating piston engine, in particular one for driving a motor vehicle, comprises cylinders with inlet and outlet valves, which control a gas exchange in the cylinders. A valve lift of an inlet or outlet valve can be modified by allowing actuation of the valve by means of different cams on a camshaft. For this purpose, there can be provided, for example, a bucket tappet which has several sections, each associated with one cam on the camshaft. By establishing or releasing an axial nonpositive engagement between the individual sections, one or more cams can be used to actuate the valve. It is thereby possible to modify valve timings, allowing the running behavior of the reciprocating piston engine to be adapted to an operating state or a load requirement, for example.

In one embodiment, an adjustable bucket tappet of this kind is controlled hydraulically. For example, first timings for the valve can be activated when a hydraulic pressure in a line assumes a first, low value and second timings can be activated when the pressure assumes a second, higher value. An electromagnetic hydraulic valve can be used to control the hydraulic pressure, for example. In other embodiments, the variable valve gear can also be directly adjustable by electric means.

Variation of the valve timings must be carried out in accordance with other operating parameters of the reciprocating piston engine. Otherwise, there is the risk that the reciprocating piston engine will be damaged by the modified timings, e.g. if there is a risk of collision between the piston and the open valve in the case of extended valve actuating times and high speeds of the reciprocating piston engine.

DE 197 36 064 A1 shows the use of a signal of a lambda probe in the exhaust duct of the reciprocating piston engine to monitor variable valve timing on the inlet side. A solution of this kind is not suitable for reciprocating piston engines which have a plurality of cylinders, the valves of which have different timings. This can be necessary, for example, when using two or more banks of cylinders, the exhaust gases from which are passed into a common exhaust section.

DE 20 2009 006 940 U1 proposes to monitor the magnetic field of an electrohydraulic changeover valve by means of a sensor in order to determine an axial position of an armature of the valve. However, the use of a separate sensor is often problematic for reasons of cost and reliability.

DE 10 2004 030 779 A1 relates to the monitoring of an electrohydraulic valve having a coil and an armature. When the coil is activated, it moves the armature, which is then held in its position by means of a permanent magnet. After the adjustment of the valve lift, the armature is pushed back mechanically into the coil, thereby inducing in the coil a voltage which is monitored. If the expected voltage fails to appear, a defect in the valve is identified. However, such a solution presupposes that a sufficiently long time has passed between the end of energization of the coil and the mechanical return of the armature to dissipate any magnetization of the coil. Otherwise, the voltage observed across the coil cannot be associated with certainty with a movement of the armature. Moreover, this method is suitable only for an electromagnetic changeover valve having a permanent magnet.

SUMMARY

In an embodiment, the present invention provides a method for monitoring an electromagnetic hydraulic valve for controlling a hydraulically adjustable valve gear of a reciprocating piston engine. The hydraulic valve includes an electromagnetic coil and a moving armature configured to connect a control port hydraulically to a high-pressure port or a low-pressure port, depending on an energization of the coil. The method includes detecting a movement of the armature, using a control unit, in response to an energization of the coil based on a mutual induction in the coil and identifying a defect, using the control unit, if the expected mutual induction does not occur.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
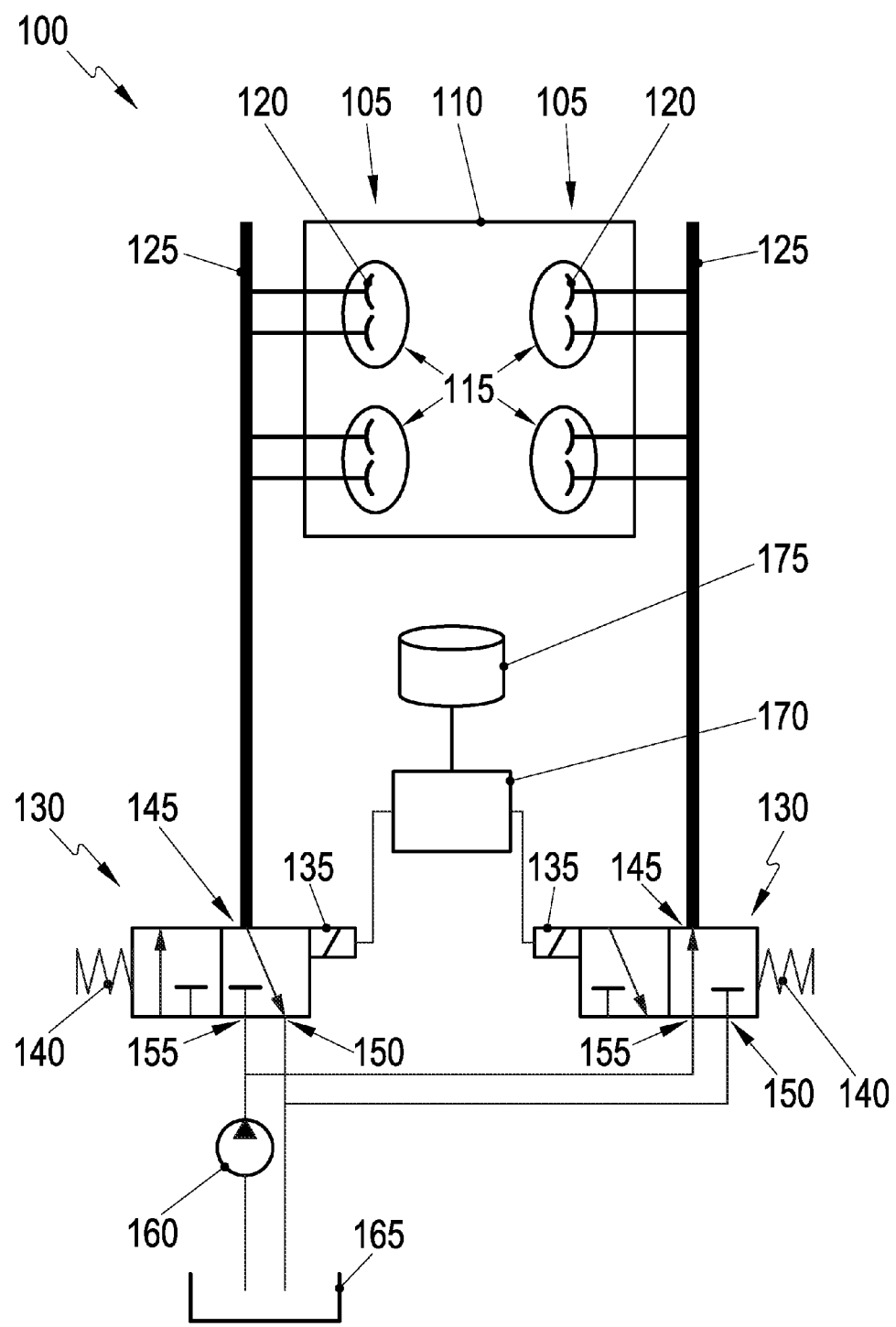
FIG. 1 shows a system for adjusting a valve gear on a reciprocating piston engine.

An aspect of the invention provides a method and an apparatus for monitoring an electromagnetic hydraulic valve for a variable valve timing system on a reciprocating piston engine.

In an embodiment a reciprocating piston engine is provided with a hydraulically adjustable valve gear which can be controlled by means of an electromagnetic hydraulic valve. In this arrangement, the hydraulic valve comprises an electromagnetic coil and a moving armature. The armature is designed to connect a control port hydraulically to a high-pressure port or a low-pressure port, depending on an energization of the coil. A control unit is furthermore provided, which is designed to detect a movement of the armature in response to an energization of the coil on the basis of a mutual induction in the coil, and to identify a defect if the expected mutual induction does not occur.

In this way, it is possible to ensure that the electromagnetically actuated hydraulic valve has definitely initiated the hydraulic process. As a result, control of the reciprocating piston engine can be improved or take place with greater reliability. Engine damage can thereby be prevented. Legal requirements relating to the reliability of control can be satisfied. The method can furthermore also be used on an engine having separate banks of cylinders, the valves of which can be adjusted bank-by-bank. It is particularly advantageous that there is no need for a dedicated additional sensor for the method described.

In an embodiment, the method comprises steps of switching on a current through the coil, sampling a voltage or a current on the coil, detecting that there is no temporary dip in the voltage or the current after switching on, and detecting the defect. In this case, the energization of the coil and the sampling of the mutually induced voltage can be better matched to one another in terms of time. In this way, it is possible to support integration of the activation of the coil and of a monitoring device for carrying out the method.

Preferably, it is furthermore detected that the temporary dip does not occur in a predetermined time window after switching on. This enables spurious pulses that lie outside the time window to be ignored. It is thus possible to avoid incorrect determination of a switching process having been carried out or not having been carried out.

A start of the time window is preferably chosen in such a way that it lies before an expected beginning of movement of the armature. The mutual induction can be caused by the moving armature, thus enabling electrical events on the coil before the beginning of movement of the armature to be ignored.

An end of the time window is preferably chosen in such a way that it lies before an expected end of movement of the armature. The mutual induction generally dies away again rapidly, thus enabling other electrical effects on the coil while the armature is still moving to be ignored.

In a particularly preferred embodiment, a fault code is stored in a non-volatile memory when the defect has been detected. Further processing of the information on the defect can then be performed at a later time. In particular, the memory can be a general fault memory, thus enabling the particular defect to be correlated with other defects on board the motor vehicle, if required.

A control unit according to an embodiment of the invention for monitoring an electromagnetic hydraulic valve for controlling a hydraulically adjustable valve gear of a reciprocating piston engine, wherein the hydraulic valve comprises an electromagnetic coil and a moving armature, and wherein the armature is designed to connect a control port hydraulically to a high-pressure port or a low-pressure port, depending on an energization of the coil, is designed to detect a movement of the armature in response to an energization of the coil on the basis of a mutual induction in the coil, and to identify a defect if the expected mutual induction does not occur.

In particular, the control unit can also be designed to adjust the valve gear by energizing or not energizing the electromagnetic coil of the hydraulic valve.

The invention is described below in more detail by means of the attached figures.

FIG. 1 shows a system 100 for adjusting a valve gear 105 on a reciprocating piston engine 110. The reciprocating piston engine 110 can be of any desired construction. In particular, the reciprocating piston engine 110 can have a plurality of banks of cylinders or a plurality of camshafts. The valve gear 105 transmits a movement of a camshaft to a valve for gas exchange in a cylinder 115 of the reciprocating piston engine 110. In particular, the valve gear 105 can comprise hydraulically controllable bucket tappets 120, which allow different valve timings. A bucket tappet 120 of this kind is known from DE 196 06 054 A1, for example.

The bucket tappets 120 are connected to hydraulic lines 125. One or more hydraulic lines 125 can be provided, depending on the number of groups in which the bucket tappets 120 are to be controlled. If there is a first, low pressure prevailing in the hydraulic line 125, a bucket tappet 120 connected to the hydraulic line 125 brings about a first timing of an associated valve. If there is a second, higher pressure prevailing in the hydraulic line 125, the bucket tappet 120 brings about a second timing.

To control the pressure in the hydraulic lines 125, electromagnetic hydraulic valves 130 are provided. Each hydraulic valve 130 comprises a 3/2-way valve, which can be actuated by means of an electromagnet 135 and returned by means of a spring 140. In other embodiments, return can also be accomplished by means of a further electromagnet 135, for example. The hydraulic valve 130 illustrated on the left is in a first position, which brings about a low hydraulic pressure in the associated hydraulic line 125, while the hydraulic valve 130 illustrated on the right is in a second position, which brings about a high hydraulic pressure in the associated hydraulic line 125. The positions can be changed by energizing or deenergizing the electromagnets 135, respectively. For example, both hydraulic valves 130 can assume the first position when the associated electromagnet 135 is not energized and the second position when the electromagnet 135 is energized.

In the first position, a control port 145, which is connected to the hydraulic line 125, is connected by the hydraulic valve 130 to a low-pressure port 150, while a high-pressure port 155 is shut off. In the second position, the control port 145 is connected to the high-pressure port 155, while the low-pressure port 150 is shut off. The high-pressure ports 155 are supplied with pressurized hydraulic fluid by a hydraulic pump 160. The low-pressure ports 150 lead to a reservoir 165, from which the hydraulic pump 160 draws in fluid.

A control unit 170 is provided for monitoring and preferably also for activating the hydraulic valves 130. The control unit 170 is designed to monitor whether or not the hydraulic valve 130 changes its position after the energization of the associated electromagnet 135. If the position does not change, a defect is identified and, as an option, a fault code indicating the defect is stored in a non-volatile memory 175. Here, the fault code can indicate circumstances of the defect, e.g. a direction of movement of the hydraulic valve 130, a time or a frequency of the defect.

Figure 2:
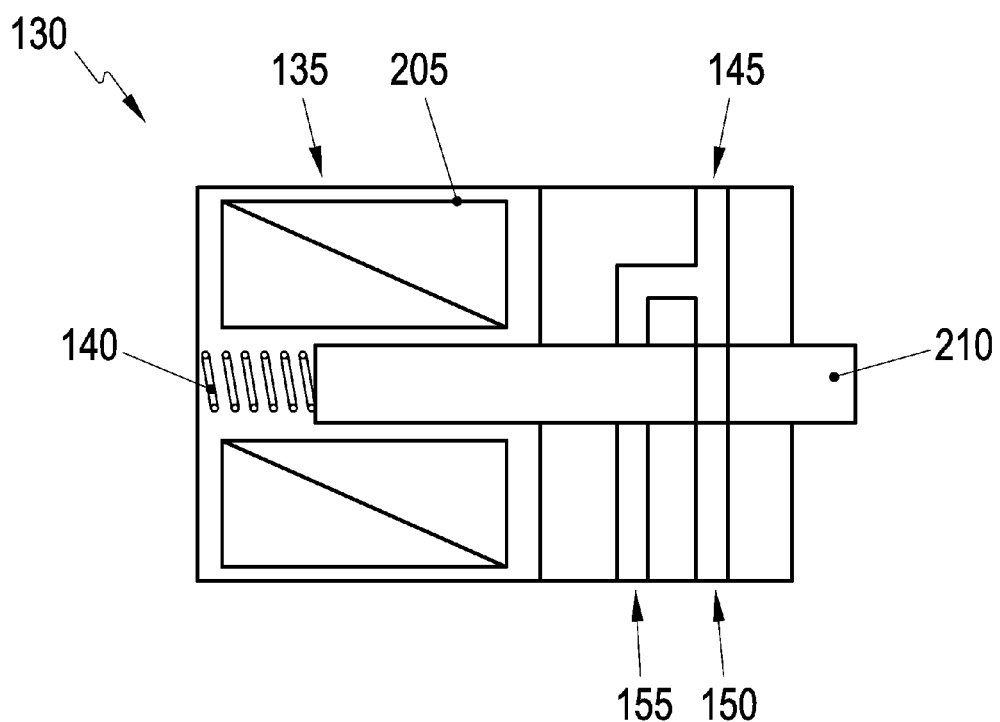
FIG. 2 shows an electromagnetic hydraulic valve for the system in FIG. 1.

FIG. 2 shows a hydraulic valve 130 for the system 100 in FIG. 1 in an illustrative embodiment in a partially schematic representation. The electromagnet 135 comprises a coil 205 and an armature 210. If the coil 205 is energized, a magnetic field builds up in the region thereof, exerting an axial force on the armature 210 counter to the force of the spring 140. In the process, there is a switchover from the illustrated first position, in which the control port 145 is connected to the low-pressure port 150, into the second position, in which the control port 145 is connected to the high-pressure port 155. Other embodiments or variant constructions of the hydraulic valve 130 are likewise possible.

Figure 3:
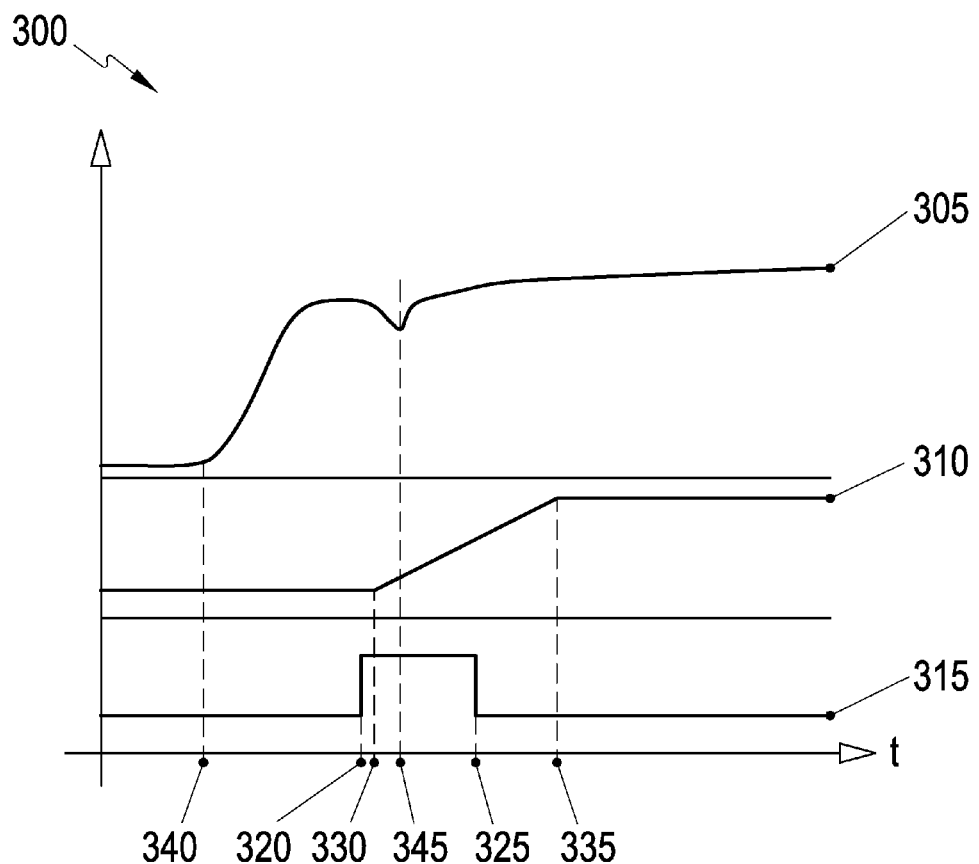
FIG. 3 shows characteristics for the hydraulic valve in FIG. 2.

FIG. 3 shows characteristics 300 at the hydraulic valve 130 in FIG. 2. The characteristics illustrated are to be taken as illustrative and schematic. A time is plotted in a horizontal direction. A first characteristic 305 relates to a voltage across the coil 205 or to a current through the coil 205. A second characteristic 310 relates to a position of the armature 210 relative to the coil 205. A third characteristic 315 relates to an enable signal for the sampling of the first characteristic 305. In a preferred embodiment, scanning of the first characteristic 305 takes place only when the enable signal is at a high level.

The enable signal 315 changes its level at a start 320 and at an end 325. The second characteristic 310 begins to change at a beginning of movement 330 and ends at an end of movement 335.

If the coil 205 is energized at a time 340, the first characteristic 305 first of all rises and remains at a high level before the armature 210 moves, as can be seen from the second characteristic 310. If the armature 210 starts to move at the beginning of movement 330, there is a mutual induction in the coil 205, which induces a current or a voltage in the coil 205 opposed to the energization current. The mutual induction causes a temporary dip at a time 345. However, the dip is usually already over even before the end of movement 335 of the armature 210 has been reached.

The start 320 and the end 325 of the enable signal 315 are preferably chosen so that a defined time domain in which the dip 345 is expected is as narrow as possible. Sampling of the first characteristic 305 preferably takes place only in this time domain.

Figure 4:
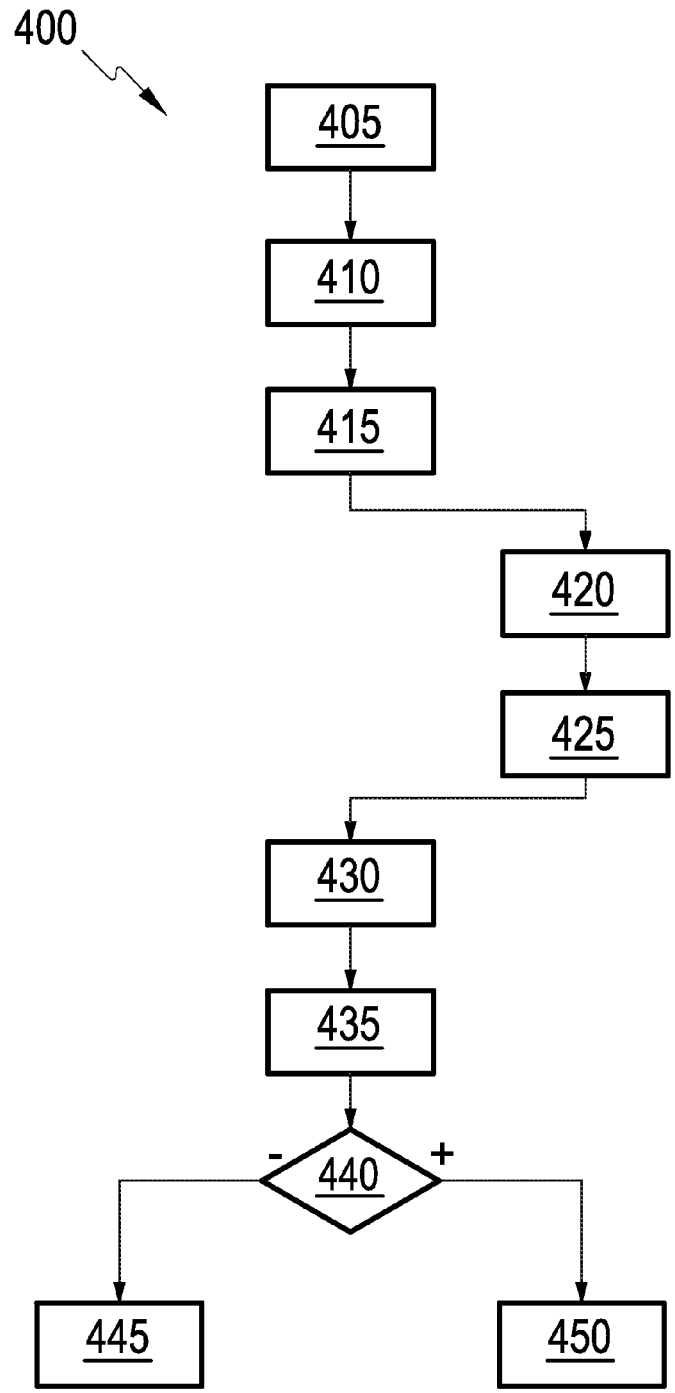
FIG. 4 shows a sequence diagram relating to the control of the hydraulic valve in FIG. 2.

FIG. 4 shows a sequence diagram of a method 400 for controlling the hydraulic valve 130 in FIG. 2. In a first step 405, which takes place at time 340 in FIG. 3, the coil 205 is energized. In a subsequent step 410, the start 320 of the enable signal 315 is determined or awaited. Once the start 320 has been detected, sampling of the voltage or current in the coil 205 is begun in a step 415.

In a step 420, it is then determined whether the first characteristic 305 in FIG. 3 is falling, before, in a step 425, it is determined whether the first characteristic 305 is rising. These two steps preferably take place in parallel with the determination of the start 320 and end 325 of the enable signal of the third characteristic 315.

In step 430, the end 325 of the enable signal of the third characteristic 315 is detected. If a rise or a fall of the first characteristic 305 does not occur in one of steps 420, 425, the method 300 nevertheless continues with step 430. In a step 435, sampling of the voltage or current in the coil 205 is then ended.

In a step 440, it is determined whether the temporary dip 345 has been observed, i.e. whether a dip in the first characteristic 305 has been observed in step 420 and a rise in the first characteristic 305 has been observed in step 425 while the enable signal 315 was allowing sampling between the start 320 and the end 325. If no temporary dip 345 has been observed, a defect in the hydraulic valve 130 is identified in a step 445, and information indicating this is preferably generated and stored in the non-volatile memory 175 in FIG. 1. If the temporary dip 345 has been observed, on the other hand, no defect is identified, and the method 400 ends in a step 450. After steps 445 and 450, the method 400 can be executed again.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for monitoring an electromagnetic hydraulic valve for controlling a hydraulically adjustable valve gear of a reciprocating piston engine, the hydraulic valve including an electromagnetic coil and a moving armature configured to connect a control port hydraulically to a high-pressure port or a low-pressure port, depending on an energization of the coil, the method comprising:
   detecting a movement of the armature, using a control unit, in response to another energization of the coil resulting from a mutual induction in the coil; caused by movement of the armature; and
   identifying a defect, using the control unit, if the expected mutual induction does not occur.

2. The method as recited in claim 1, further comprising:
   switching on a current through the coil;
   sampling a voltage or a current on the coil;
   detecting that there is no temporary dip in the voltage or the current after switching on, and
   detecting the defect.

3. The method as recited in claim 2, further comprising detecting that the temporary dip does not occur in a predetermined time window after switching on.

4. The method as recited in claim 3, wherein a start of the time window is chosen in such a way that it lies before an expected beginning of movement of the armature.

5. The method as recited in claim 3, wherein an end of the time window is chosen in such a way that it lies before an expected end of movement of the armature.

6. The method as recited in claim 4, wherein an end of the time window is chosen in such a way that it lies before an expected end of movement of the armature.

7. The method as recited in claim 1, storing a fault code in a non-volatile memory when the defect has been detected.

8. The method as recited in claim 2, storing a fault code in a non-volatile memory when the defect has been detected.

9. The method as recited in claim 3, storing a fault code in a non-volatile memory when the defect has been detected.

10. The method as recited in claim 4, storing a fault code in a non-volatile memory when the defect has been detected.

11. The method as recited in claim 5, storing a fault code in a non-volatile memory when the defect has been detected.

12. The method as recited in claim 6, storing a fault code in a non-volatile memory when the defect has been detected.

13. A control unit for monitoring an electromagnetic hydraulic valve for controlling a hydraulically adjustable valve gear of a reciprocating piston engine, the hydraulic valve including an electromagnetic coil and a moving armature configured to connect a control port hydraulically to a high-pressure port or a low-pressure port, depending on an energization of the coil, the control unit being configured:
   to detect a movement of the armature in response to another energization of the coil resulting from a mutual induction in the coil; caused by movement of the armature; and to identify a defect if the expected mutual induction does not occur.

* * * * *